US011639160B2

(12) United States Patent
Georgin

(10) Patent No.: US 11,639,160 B2
(45) Date of Patent: May 2, 2023

(54) ELECTRICAL POWER CONNECTION IN AN EMERGENCY PARK BRAKE SYSTEM

(71) Applicant: GOODRICH CORPORATION, Charlotte, NC (US)

(72) Inventor: Marc Georgin, Dayton, OH (US)

(73) Assignee: Goodrich Corporation, Charlotte, NC (US)

(*) Notice: Subject to any disclaimer, the term of this patent is extended or adjusted under 35 U.S.C. 154(b) by 337 days.

(21) Appl. No.: 17/109,733

(22) Filed: Dec. 2, 2020

(65) Prior Publication Data

US 2021/0086735 A1 Mar. 25, 2021

Related U.S. Application Data

(62) Division of application No. 15/490,581, filed on Apr. 18, 2017, now Pat. No. 10,882,498.

(51) Int. Cl.
| | |
|---|---|
| *B60T 8/17* | (2006.01) |
| *B60T 7/04* | (2006.01) |
| *B60T 7/08* | (2006.01) |
| *B60T 13/74* | (2006.01) |
| *F16D 55/38* | (2006.01) |
| *B64C 25/44* | (2006.01) |

(52) U.S. Cl.
CPC ............ *B60T 8/1703* (2013.01); *B60T 7/042* (2013.01); *B60T 7/085* (2013.01); *B60T 13/741* (2013.01); *B60T 13/746* (2013.01); *B64C 25/44* (2013.01); *F16D 55/38* (2013.01); *B60T 2220/04* (2013.01)

(58) Field of Classification Search
None
See application file for complete search history.

(56) References Cited

U.S. PATENT DOCUMENTS

| 6,135,230 A | 10/2000 | Schenck |
| 6,402,259 B2 | 6/2002 | Corio |
| 7,128,376 B2 | 10/2006 | Williams |
| (Continued) | | |

FOREIGN PATENT DOCUMENTS

| CN | 106394880 | 2/2017 |
| EP | 2871104 | 5/2015 |
| (Continued) | | |

OTHER PUBLICATIONS

European Patent Office; European Office Action dated Mar. 18, 2022 in application No. 18168045.5.

(Continued)

*Primary Examiner* — Todd Melton
*Assistant Examiner* — Jason R Roberson
(74) *Attorney, Agent, or Firm* — Snell & Wilmer L.L.P.

(57) ABSTRACT

An emergency park brake system of an aircraft may include an electrical power interface, an electromechanical actuator, and a hydraulic brake valve. The electrical power interface may be configured to receive electrical power from a power source. The electromechanical actuator may be in selective power receiving communication with the electrical power interface and the electromechanical actuator may be mechanically coupled to and configured to selectively actuate the hydraulic brake valve. The electrical connection between the electromechanical actuator and the electrical power interface may be based on an emergency braking input.

13 Claims, 6 Drawing Sheets

(56) References Cited

U.S. PATENT DOCUMENTS

| | | |
|---|---|---|
| 7,618,100 B2 | 11/2009 | Griffith et al. |
| 7,766,431 B2 | 8/2010 | Griffith et al. |
| 8,214,121 B2 | 7/2012 | Cahill |
| 8,226,173 B1 * | 7/2012 | Murray .............. B60T 15/16 303/116.1 |
| 8,668,279 B2 | 3/2014 | Van Deventer |
| 8,948,994 B2 | 2/2015 | Frank |
| 8,974,012 B2 | 3/2015 | Griffith et al. |
| 9,028,014 B2 * | 5/2015 | Clary .............. B60T 13/741 303/126 |
| 9,039,102 B2 * | 5/2015 | Cahill .............. B60T 7/12 303/126 |
| 9,216,720 B2 | 12/2015 | Cahill |
| 9,387,840 B1 | 7/2016 | Cahill et al. |
| 2009/0240412 A1 * | 9/2009 | Cahill .............. B60T 17/22 303/20 |
| 2010/0274458 A1 | 10/2010 | Cahill |
| 2013/0060438 A1 | 3/2013 | Cahill |
| 2013/0264418 A1 | 10/2013 | Frank |
| 2018/0162331 A1 | 6/2018 | Ayichew |

FOREIGN PATENT DOCUMENTS

| | | |
|---|---|---|
| EP | 2876011 | 6/2018 |
| EP | 3333069 | 6/2018 |

OTHER PUBLICATIONS

European Patent Office, European Search Report dated Sep. 25, 2018 in Application No. 18168045.5.
USPTO, Restriction/Election Requirement dated Jul. 22, 2019 in U.S. Appl. No. 15/490,581.
USPTO, Pre-Interview First Office Action dated Oct. 4, 2019 in U.S. Appl. No. 15/490,581.
USPTO, Final Office Action dated Feb. 6, 2020 in U.S. Appl. No. 15/490,581.
USPTO, Advisory Action dated Apr. 9, 2020 in U.S. Appl. No. 15/490,581.
USPTO, Non-Final Office Action dated Aug. 7, 2020 in U.S. Appl. No. 15/490,581.
USPTO, Notice of Allowance dated Nov. 3, 2020 in U.S. Appl. No. 15/490,581.
European Patent Office, European Office Action dated Oct. 12, 2020 in Application No. 18168045.5.

* cited by examiner

ELECTRICAL POWER CONNECTION IN AN EMERGENCY PARK BRAKE SYSTEM

CROSS-REFERENCE TO RELATED APPLICATIONS

This application is a divisional of, claims priority to and the benefit of, U.S. Ser. No. 15/490,581 filed Apr. 18, 2017 and entitled "ELECTRICAL POWER CONNECTION IN AN EMERGENCY PARK BRAKE SYSTEM," which is incorporated herein by reference in its entirety for all purposes.

FIELD

The present disclosure relates to aircraft systems, and more specifically, to emergency park brake systems.

BACKGROUND

Aircraft typically have brakes on the wheels to slow the aircraft during aborted takeoffs, landings, and/or while taxiing. Additionally, some aircraft employ emergency park brake systems that execute emergency braking and/or maintain a braking force while the aircraft is parked. Conventional brake systems generally include a mechanical linkage (e.g., a cable) that extends between a user brake interface (e.g., a pedal or a handle) and a braking force actuator. These conventional mechanical linkage systems, however, can be difficult and complex to implement. While electrical configurations can be implemented to replace and solve some of the complexities of the mechanical linkage configurations, conventional electrical configurations can be susceptible to uncommanded braking. For example, unintentionally executed, undesired, or uncommanded braking, whether due to user error or component failure, may result in the application of a braking force on the wheels of an aircraft at inopportune times (e.g., during takeoff).

SUMMARY

In various embodiments, the present disclosure provides an emergency park brake system of an aircraft. The emergency park brake system may include an electrical power interface configured to receive electrical power from a power source, an electromechanical actuator in selective power receiving communication with the electrical power interface, and a hydraulic brake valve, wherein the electromechanical actuator is mechanically coupled to and configured to selectively actuate the hydraulic brake valve.

In various embodiments, whether the electromechanical actuator is in power receiving communication with the electrical power interface is based on an emergency braking input. In various embodiments, the emergency park brake system further includes a user input interface, wherein the emergency braking input is a displacement of the user input interface. The emergency park brake system may include a displacement sensor coupled to the user input interface. The displacement sensor may be configured to detect the displacement of the user input interface and generate an emergency braking command based on the displacement of the user input interface. In various embodiments, the emergency park brake system further includes an excitation monitor coupled to the displacement sensor and configured to detect an excitation level of the displacement sensor.

In various embodiments, whether the electromechanical actuator is in power receiving communication with the electrical power interface is based on the emergency braking command and the excitation level of the displacement sensor. In various embodiments, the electromechanical actuator is electrically disconnected from the electrical power interface in response to the displacement of the user input interface being less than a threshold displacement.

Also disclosed herein, according to various embodiments, is an emergency park brake system of an aircraft. The emergency park brake system may include an electrical power interface configured to receive electrical power from a power source, an electromechanical actuator in selective power receiving communication with the electrical power interface, and a hydraulic brake valve, wherein the electromechanical actuator is mechanically coupled to and configured to selectively actuate the hydraulic brake valve. The emergency park brake system may further include a plurality of discrete hardware controllers interconnected via a first electrical communication pathway and a second electrical communication pathway, wherein the plurality of discrete hardware controllers have instructions stored thereon that cause the emergency park brake system to perform various operations. The various operations include receiving an emergency braking input, determining an emergency braking command based on the emergency braking input, determining a power supply condition based on the emergency braking command, transmitting, via the first electrical communication pathway, the emergency braking command to the electromechanical actuator, and transmitting, based on the power supply condition and via the second electrical communication pathway, electrical power from the electrical power interface to the electromechanical actuator.

In various embodiments, the emergency park brake system further includes a user input interface, wherein the emergency braking input is a displacement of the user input interface. The emergency park brake system may further include a displacement sensor coupled to the user input interface. The displacement sensor may be configured to detect the displacement of the user input interface and generate the emergency braking command based on the displacement of the user input interface. In various embodiments, whether the electromechanical actuator is in power receiving communication with the electrical power interface is based on the emergency braking command.

In various embodiments, the emergency park brake system further includes an excitation monitor coupled to the displacement sensor and configured to detect an excitation level of the displacement sensor. In various embodiments, whether the electromechanical actuator is in power receiving communication with the electrical power interface is based on the emergency braking command and the excitation level of the displacement sensor. In various embodiments, the power supply condition is based on the excitation level of the displacement sensor.

In various embodiments, determining the emergency braking command comprises comparing the displacement of the user input interface with a threshold displacement. In various embodiments, the power supply condition indicates a power disconnection in response to the displacement of the user input interface being less than the threshold displacement. In various embodiments, the power supply condition indicates a power connection in response to the displacement of the user input interface being greater than the threshold displacement.

Also disclosed herein, according to various embodiments, is a method of controlling an emergency park brake system of an aircraft. The method may include receiving, by an emergency park brake controller, an emergency braking input. The method may also include determining, by a first electrical communication pathway of the emergency park brake controller, a power connection command based on the emergency braking input. The method may also include determining, by a second electrical communication pathway of the emergency park brake controller, an emergency braking command based on the emergency braking input. The method may further include actuating, by the emergency park brake controller, via an electromechanical actuator, and based on the power connection command and the emergency braking command, a hydraulic brake valve.

In various embodiments, actuating the hydraulic brake valve to apply a braking force to wheels of the aircraft is performed in response to the power connection command indicating a power supply condition that indicates a power connection. In various embodiments, actuating the hydraulic brake valve includes transmitting, by the emergency park brake controller and via the first electrical communication pathway, the power connection command to the electromechanical actuator. In various embodiments, actuating the hydraulic brake valve includes transmitting, by the emergency park brake controller, based on the power supply condition, and via the second electrical communication pathway, the emergency braking command to the electromechanical actuator.

The forgoing features and elements may be combined in various combinations without exclusivity, unless expressly indicated herein otherwise. These features and elements as well as the operation of the disclosed embodiments will become more apparent in light of the following description and accompanying drawings.

Figure 1A:
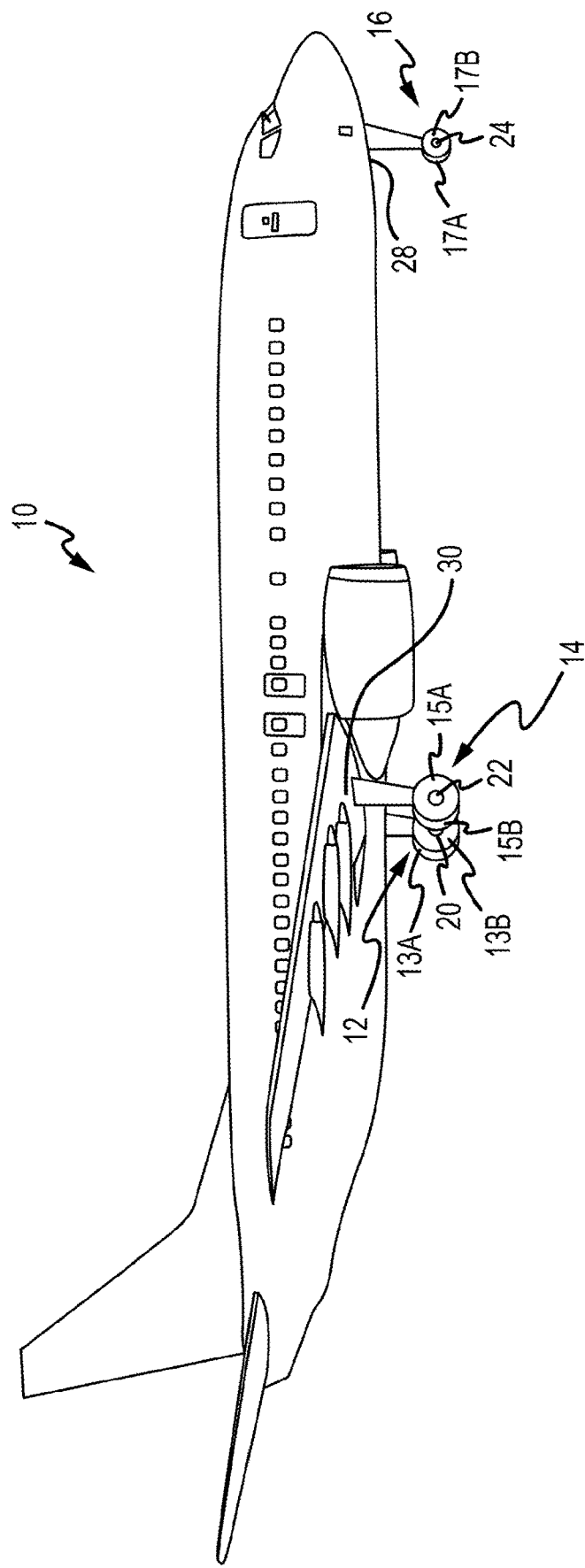
FIG. 1A illustrates an exemplary aircraft having an emergency park brake system, in accordance with various embodiments.

The subject matter of the present disclosure is particularly pointed out and distinctly claimed in the concluding portion of the specification. A more complete understanding of the present disclosure, however, may best be obtained by referring to the detailed description and claims when considered in connection with the drawing figures, wherein like numerals denote like elements.

DETAILED DESCRIPTION

The detailed description of exemplary embodiments herein makes reference to the accompanying drawings, which show exemplary embodiments by way of illustration. While these exemplary embodiments are described in sufficient detail to enable those skilled in the art to practice the disclosure, it should be understood that other embodiments may be realized and that logical changes and adaptations in design and construction may be made in accordance with this disclosure and the teachings herein without departing from the spirit and scope of the disclosure. Thus, the detailed description herein is presented for purposes of illustration only and not of limitation.

Referring now to FIG. 1A, in accordance with various embodiments, an aircraft 10 may include landing gear such as main landing gear 12, main landing gear 14 and nose landing gear 16. Main landing gear 12, main landing gear 14, and nose landing gear 16 may generally support aircraft 10 when aircraft 10 is not flying, allowing aircraft 10 to taxi, take off and land without damage. Main landing gear 12 may include wheel 13A and wheel 13B coupled by an axle 20. Main landing gear 14 may include wheel 15A and wheel 15B coupled by an axle 22. Nose landing gear 16 may include nose wheel 17A and nose wheel 17B coupled by an axle 24. In various embodiments, aircraft 10 may comprise any number of landing gears and each landing gear may comprise any number of wheels. Main landing gear 12, main landing gear 14, and nose landing gear 16 may each be retracted for flight.

Aircraft 10 may also include a primary brake system, which may be applied to a wheel of a landing gear. The primary brake system of aircraft 10 may comprise a collection of subsystems that produce output signals for controlling the braking force and/or torque applied at each wheel (e.g., wheel 13A, wheel 13B, wheel 15A, wheel 15B, etc.). The primary brake system may communicate with the brakes of each landing gear (e.g., main landing gear 12, main landing gear 14, and/or nose landing gear 16), and each brake may be mounted to each wheel to apply and release braking force on one or more wheels (e.g., as described above). The brakes of an aircraft 10 may include a non-rotatable wheel support, a wheel (e.g., wheel 13A, wheel 13B, wheel 15A, wheel 15B, wheel 17A, and/or wheel 17B) mounted to the wheel support for rotation, and a brake disk stack.

Figure 1B:
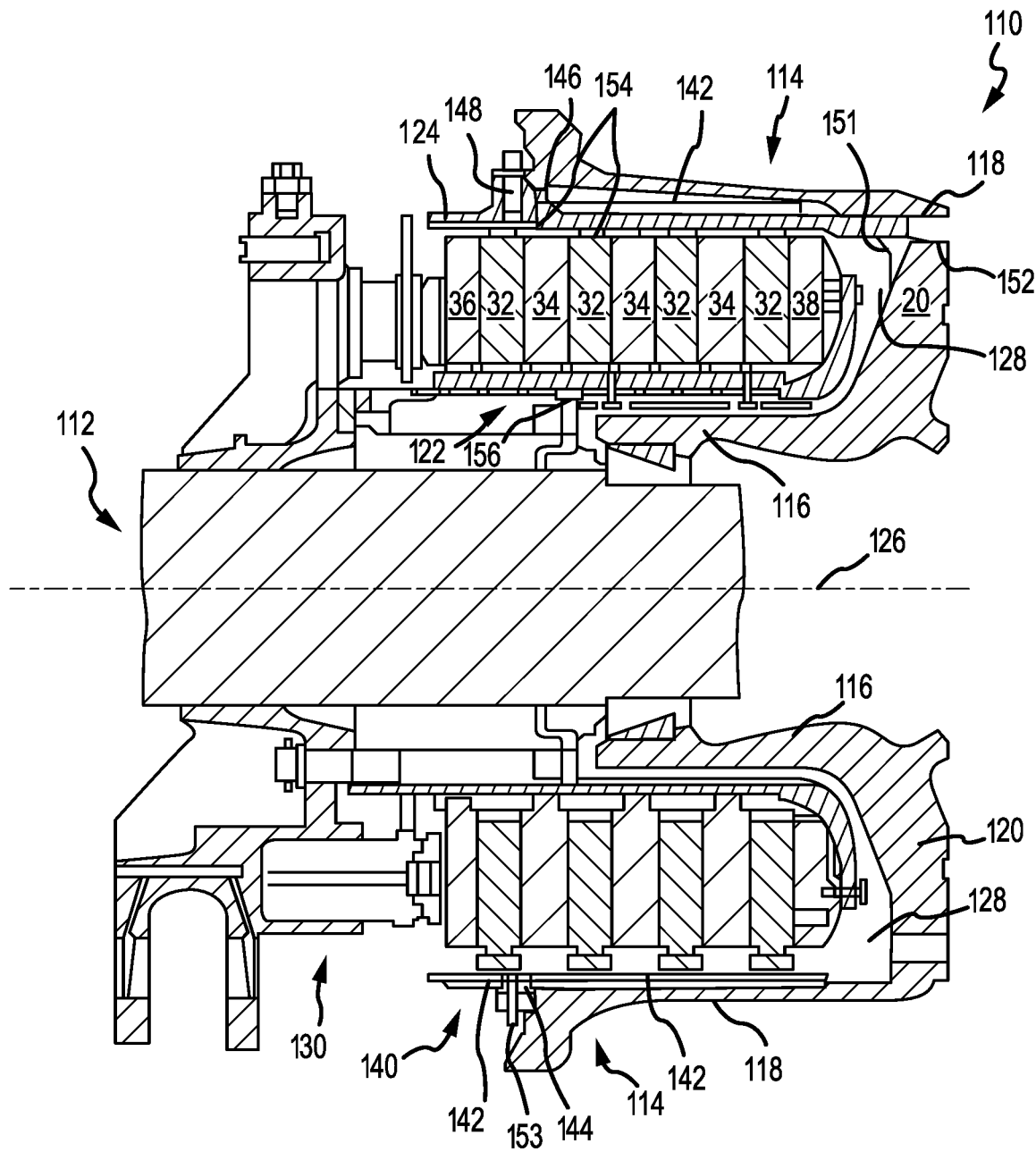
FIG. 1B illustrates a cross-sectional view of a brake assembly, in accordance with various embodiments.

Referring to FIG. 1B, brake assembly 110 may be found on an aircraft, in accordance with various embodiments. Brake assembly 110 may, for example, comprise a bogie axle 112, a wheel 114 including a hub 116 and a wheel well 118, a web 120, a torque take-out assembly 122, one or more torque bars 124, a wheel rotational axis 126, a wheel well recess 128, an actuator 130, multiple brake rotors 32, multiple brake stators 34, a pressure plate 36, an end plate 38, a heat shield 140, multiple heat shield sections 142, multiple heat shield carriers 144, an air gap 146, multiple torque bar bolts 148, a torque bar pin 151, a wheel web hole 152, multiple heat shield fasteners 153, multiple rotor lugs 154, and multiple stator slots 156.

Brake disks (e.g., interleaved rotors 32 and stators 34) are disposed in wheel well recess 128 of wheel well 118. Rotors 32 are secured to torque bars 124 for rotation with wheel 114, while stators 34 are engaged with torque take-out assembly 122. At least one actuator 130 is operable to compress interleaved rotors 32 and stators 34 for stopping the aircraft. In this example, actuator 130 is shown as a hydraulically actuated piston. Pressure plate 36 and end plate 38 are disposed at opposite ends of the interleaved rotors 32 and stators 34. Rotors 32 and stators 34 can comprise any material suitable for friction disks, including ceramics or carbon materials, such as a carbon/carbon composite.

Through compression of interleaved rotors 32 and stators 34 between pressure plates 36 and end plate 38, the resulting frictional contact slows, stops, and/or prevents rotation of wheel 114. Torque take-out assembly 122 is secured to a stationary portion of the landing gear truck such as a bogie beam or other landing gear strut, such that torque take-out assembly 122 and stators 34 are prevented from rotating during braking of the aircraft.

Figure 2A:
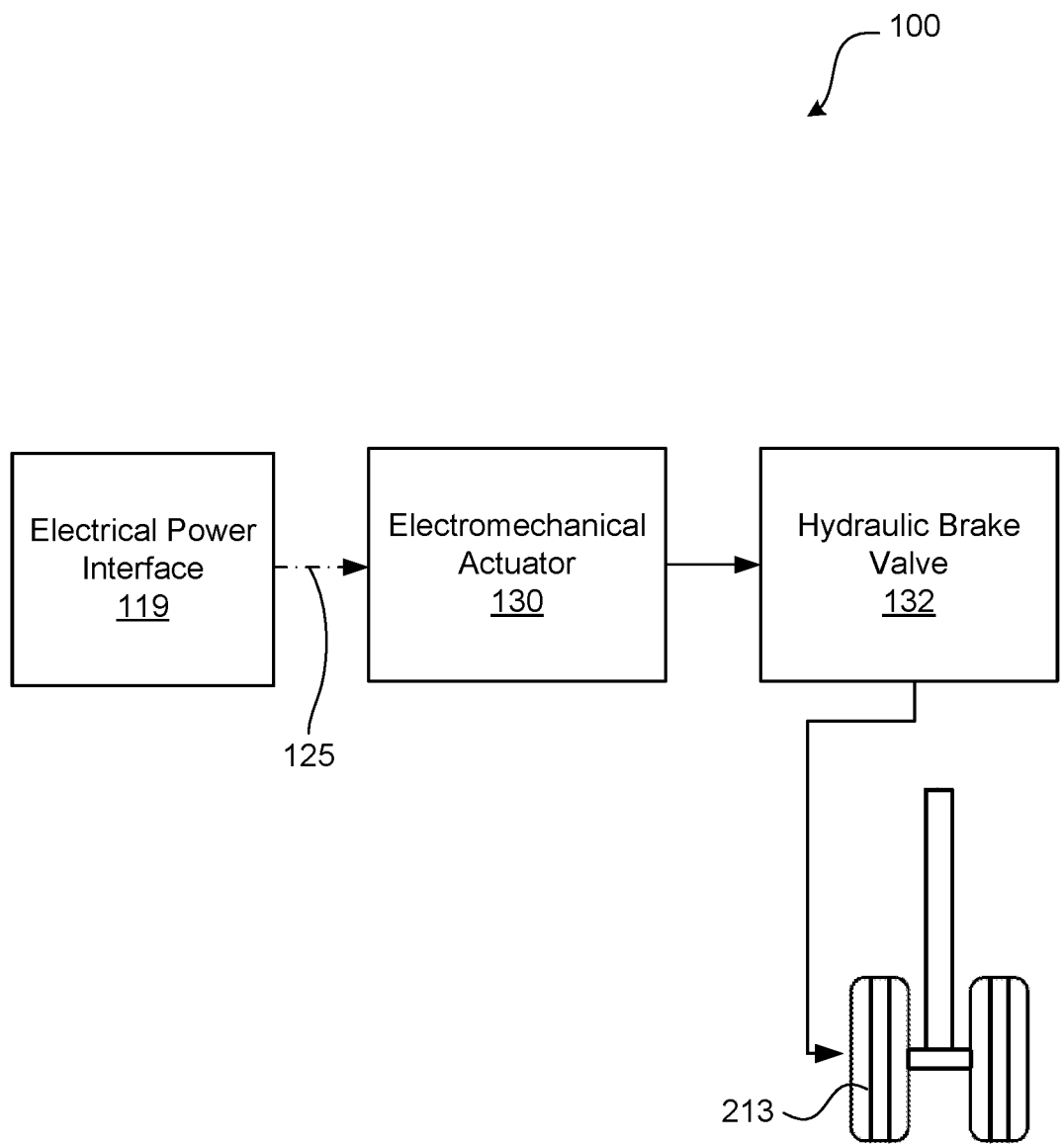
FIGS. 2A, 2B and 2C illustrate schematics of an emergency park brake system, in accordance with various embodiments.

In various embodiments, and with reference to FIG. 2A, aircraft 10 may also include one or more emergency park brake systems 100. The emergency park brake systems 100 of aircraft 10 may include an electrical power interface 119, an electromechanical actuator 130, and a hydraulic brake valve 132. The hydraulic brake valve 132 may be coupled to one or more wheels 213 of the aircraft 10.

As described in greater detail below, the emergency park brake system 100 generally controls an emergency or parking braking force/torque that is applied and implemented via a brake assembly (e.g., hydraulic brake valve 132) to each wheel 213, according to various embodiments. The emergency park brake system 100 may be separate from, for example, a primary brake system. In various embodiments, various components of the emergency park brake system 100, such as the wheel/brake assembly 213, may be shared with a primary brake system while various other components of the emergency park brake system 100, such as hydraulic brake valve 132 or an emergency park brake controller 220 described below with reference to FIG. 2B, are not shared with the primary brake system.

The hydraulic brake valve 132, according to various embodiments, is actuated via the electromechanical actuator 130. Said differently, the electromechanical actuator 130 may be mechanically coupled to the hydraulic brake valve 132 and may supplant/replace the cable that would be utilized in a conventional hydraulic configuration. For example, the brake system 100 may receive an emergency braking input and the electromechanical actuator 130 may actuate the hydraulic brake valve 132 that controls the fluid pressure in the hydraulic brake valve 132.

In various embodiments, the electrical power interface 119 is configured to receive electrical power from a power source and the electromechanical actuator 130 may be in selective power receiving communication with the electrical power interface 119, as indicated by dashed line 125. Said differently, the electromechanical actuator 130 is not always connected to the power source via the electrical power interface 119, according to various embodiments. For example, in order to prevent inadvertent or uncommanded braking, the electromechanical actuator 130 may be electrically disconnected from the electrical power interface 119 unless a power supply condition is satisfied. In response to the power supply condition being satisfied or in response to the power supply condition indicating a powered connection, the electrical power interface 119 may be electrically connected to the electromechanical actuator 130 and the electromechanical actuator 130 may control braking force applied to the wheels 213 via selective actuation of the hydraulic brake valve 132 based on a determined braking command (as described in greater detail below).

Figure 2B:
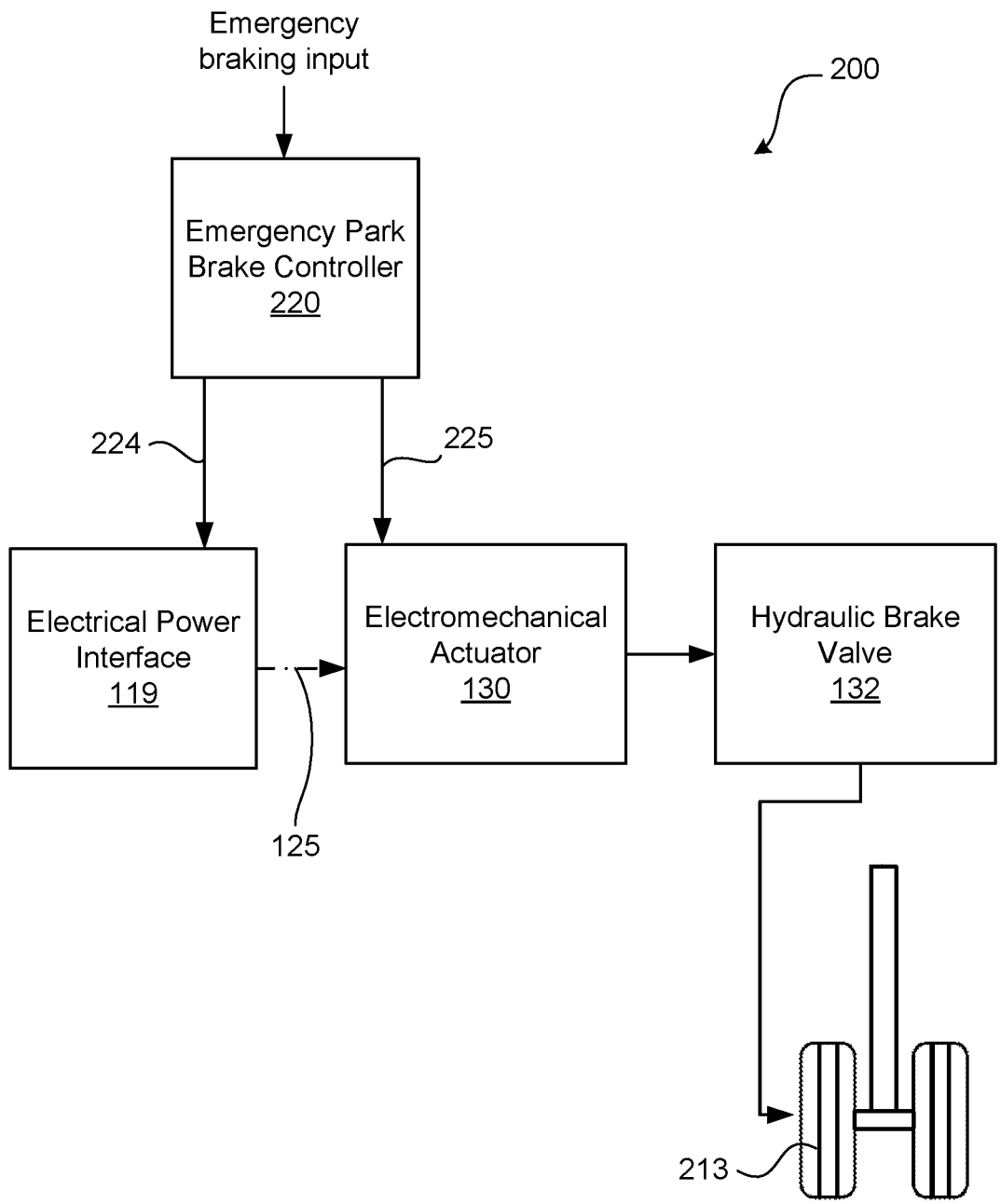

In various embodiments, and with reference to FIG. 2B, the emergency park brake system 200 may also include an emergency park brake controller 220. The emergency park brake controller 220 is generally configured to receive an emergency braking input (or park braking input), determine an emergency braking command based on the emergency braking input, and determine the power supply condition, according to various embodiments and as described in greater detail below. The emergency park brake controller 220, according to various embodiments, is separate from computer systems onboard aircraft 10 such as, for example, a brake control unit (BCU), a full authority digital engine control (FADEC), an engine-indicating and crew-alerting system (EICAS), and/or the like. The emergency park brake controller 220 may be a component of the electromechanical actuator or may be a standalone computer system separate from overall control system of the aircraft 10. The emergency park brake controller 220 may include one or more processors and/or one or more tangible, non-transitory memories and be capable of implementing logic. Each processor can be a general purpose processor, a digital signal processor (DSP), an application specific integrated circuit (ASIC), a field programmable gate array (FPGA) or other programmable logic device, discrete gate or transistor logic, discrete hardware components, or any combination thereof.

In various embodiments, the processor of the emergency park brake controller 220 may be configured to implement various logical operations in response to execution of instructions, for example, instructions stored on the non-transitory memory (e.g., tangible, computer-readable medium). As used herein, the term "non-transitory" is to be understood to remove only propagating transitory signals per se from the claim scope and does not relinquish rights to all standard computer-readable media that are not only propagating transitory signals per se. Stated another way, the meaning of the term "non-transitory computer-readable medium" and "non-transitory computer-readable storage medium" should be construed to exclude only those types of transitory computer-readable media which were found in In Re Nuijten to fall outside the scope of patentable subject matter under 35 U.S.C. § 101.

In various embodiments, the term "emergency park brake controller 220" refers to a plurality of discrete hardware controllers interconnected via a first electrical communication pathway and a second electrical communication pathway. The plurality of discrete hardware controllers may have instructions stored thereon that cause the emergency park brake system to perform the operations described below.

In various embodiments, and with continued reference to FIG. 2B, the emergency park brake controller 220 may receive an emergency braking input via user displacement of a pedal or a handle, as described in greater detail below with reference to FIG. 2C. The emergency park brake controller 220 generates an emergency braking command based on the emergency braking input, according to various embodiments. The emergency park brake controller 220 also generates a power supply condition that is based on the emergency braking command, according to various embodiments. As mentioned above, the power supply condition may indicate a "power disconnection" between the electrical power interface 119 and the electromechanical actuator 130 or the power supply condition may indicate a "power connection" between the electrical power interface 119 and the electromechanical actuator 130.

In various embodiments, the emergency park brake controller 220 includes a first electrical communication pathway 224 and a second electrical communication pathway 225. The emergency park brake controller 220 may send a power connection command via the first electrical communication pathway 224 to the electrical power interface 119. The power connection demand may indicate whether the selective electrical connection 125 between electrical power interface and the electromechanical actuator 130 is to be electrically connected or electrically disconnected. The emergency park brake controller 220 may send the emergency braking command to the electromechanical actuator 130 via the second electrical communication pathway 225. The two separate electrical communication pathways 224, 225 provide a degree of redundancy to ensure that a braking force is intended and desired to be applied to the wheels 213. Said differently, and according to various embodiments, the electromechanical actuator 130 only actuates the hydraulic brake valve 132 to effectuate a braking force on the wheels 213 in response to the power supply condition being satisfied (e.g. indicating a power connection) and in response to the generated emergency braking command calling for application of braking force.

Figure 2C:
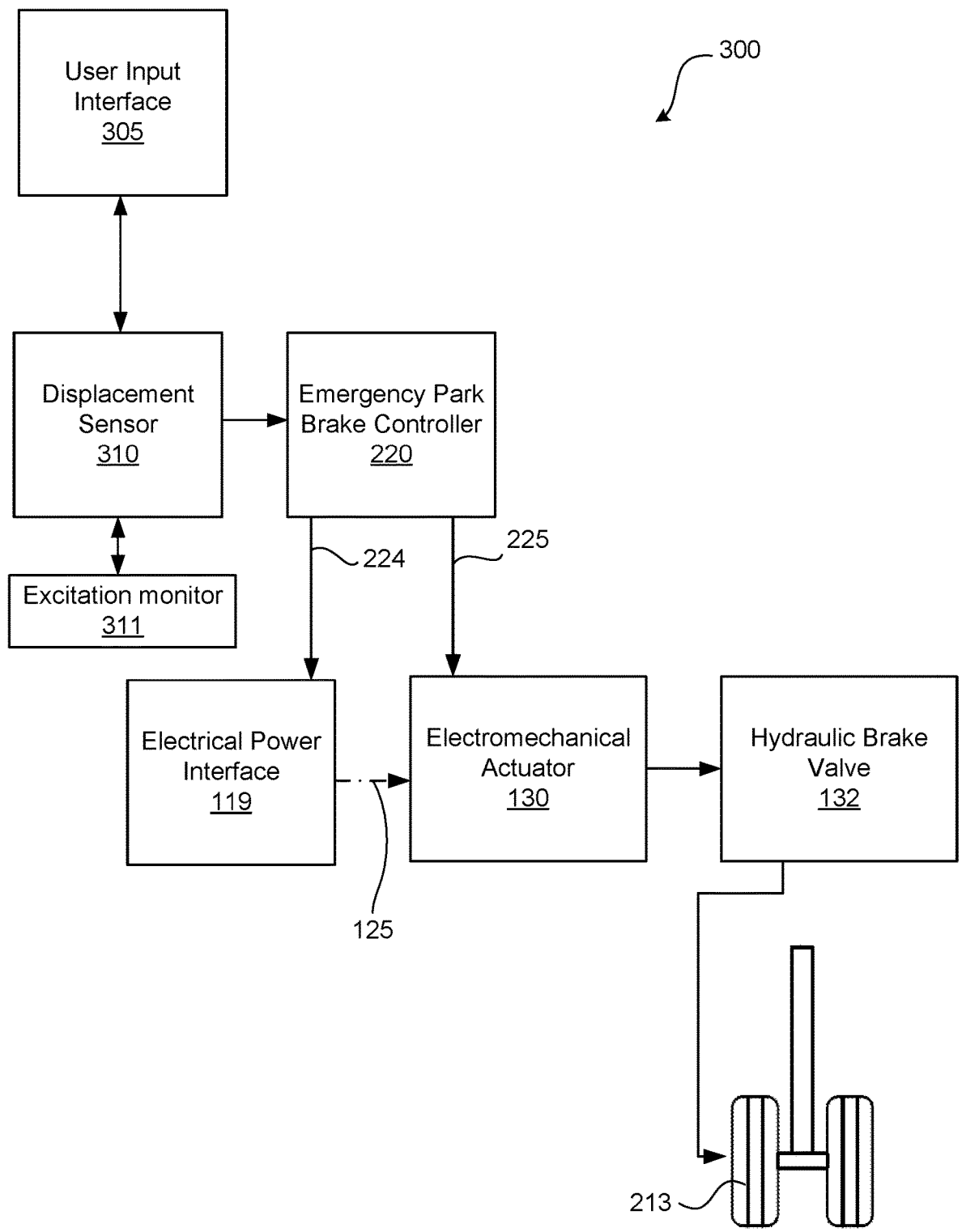

In various embodiments, and with reference to FIG. 2C, the emergency park brake system 300 further includes a user input interface 305 and a displacement sensor 310. In various embodiments, the emergency braking input may be received in the form of a displacement of the user input interface 305. The user input interface 305 of the emergency park brake system 300 is configured to receive actuation/input from a user. For example, the user input interface 305 may be an emergency brake handle, level, or other movable mechanical component, that is integrated within a cockpit of the aircraft 10. In various embodiments, the user input interface 305 is separate from the cockpit. In various embodiments, the user input interface 305 may be a remote lever or other user interface that is suitable for being actuated by a remote user (e.g., unmanned aircraft). The displacement sensor 310, according to various embodiments, is coupled to the user input interface 305 and is configured to detect displacement of the user input interface 305 from a neutral or "zero" position and communicate the detected displacement to the emergency park brake controller 220.

The displacement sensor 310 may include any suitable sensor, such as, for example, a linear variable differential transformer (LVDT), a rotary variable differential transformer (RVDT), a potentiometer, a magnetic encoder, and/or the like. The displacement sensor 310 may generate and transmit the detected displacement as a variable brake signal (e.g., representative of a percentage of displacement of the user input interface 305 from a zero, reference position to a maximum reference position).

In various embodiments, the emergency park brake controller 220 is configured to generate the emergency braking by comparing the detected displacement with a predetermined threshold displacement. The threshold displacement may refer to a predetermined minimum displacement value (e.g., a "deadband" threshold). For example, if the detected displacement of the user input interface 305 is less than the threshold displacement, the emergency braking command generated by the emergency park brake controller 220 may indicate a null demand/command. That is, if the user input interface 305 has not been actuated or if the user input interface 305 is not sufficiently actuated (displaced), a signal indicating "no braking" may be sent by the emergency park brake controller 220 to the electromechanical actuator 130, according to various embodiments. However, if the user input interface 305 is sufficiently actuated (displaced) beyond the threshold displacement, the emergency braking command indicates a braking force to be actuated and thus a signal indicating "braking" is sent to the electromechanical actuator 130.

In various embodiments, the threshold displacement is about 20% from a zero position of the user input interface 305 to a maximum displacement position of the user input interface 305. In various embodiments, the threshold displacement is about 15% from a zero position of the user input interface 305 to a maximum displacement position of the user input interface 305. In various embodiments, the threshold displacement is about 10% from a zero position of the user input interface 305 to a maximum displacement position of the user input interface 305. As used in the instant context, the term "about" refers to plus or minus 1.0%. In various embodiments, the power supply condition is dependent on the emergency braking command. For example, if the emergency braking command indicates "no braking," the power supply condition generated and transmitted by the emergency park brake controller via the first electrical communication pathway 224 may indicate "power disconnection."

In various embodiments, the emergency park brake system 300 further includes one or more excitation monitors 311 that are coupled to the displacement sensor(s) 310. The excitation monitor 311 is configured to provide electrical power to the displacement sensor 310 so that the displacement position can be provided to the emergency park brake controller 220. The excitation level of the displacement sensor 310 may be, for example, in the form of a sine wave having a frequency of 2500 Hertz and a voltage of 3.5 V (root mean squared voltage). In various embodiments, whether the electromechanical actuator 130 is in power receiving communication with the electrical power interface 119 is based on the detected valid excitation level of the displacement sensor 310 (e.g., the excitation monitor 311 checks the validity of the excitation level of the displacement sensor 310). For example, if the excitation level provided from the excitation monitor 311 to the displacement sensor 310 is invalid (e.g., the displacement sensor is not detecting a displacement of the user input interface 305), the power supply condition may indicate "power disconnection" and the selective electrical connection 125 between the electromechanical actuator 130 and the electrical power interface 119 may be electrically disconnected.

In various embodiments, the emergency park brake system 300 may include other detectors, sensors, or components that check various operating parameters to verify that a braking command is intended. For example, the emergency park brake system 300 may include multiple user input interfaces, such as an inboard and an outboard handle/lever. In various embodiments, the emergency park brake system 300 may include multiple displacement sensors. If one of the operating parameters does not meet a given threshold, the emergency park brake controller 220 may generate a power supply condition that indicates "power disconnection" or no power delivery to the electromechanical actuator 130. If all the operating parameters meet the given thresholds, the emergency park brake controller 220 may generate a power supply condition that indicates "power connection" and thus the electromechanical actuator 130 may be electorally powered.

Figure 3:
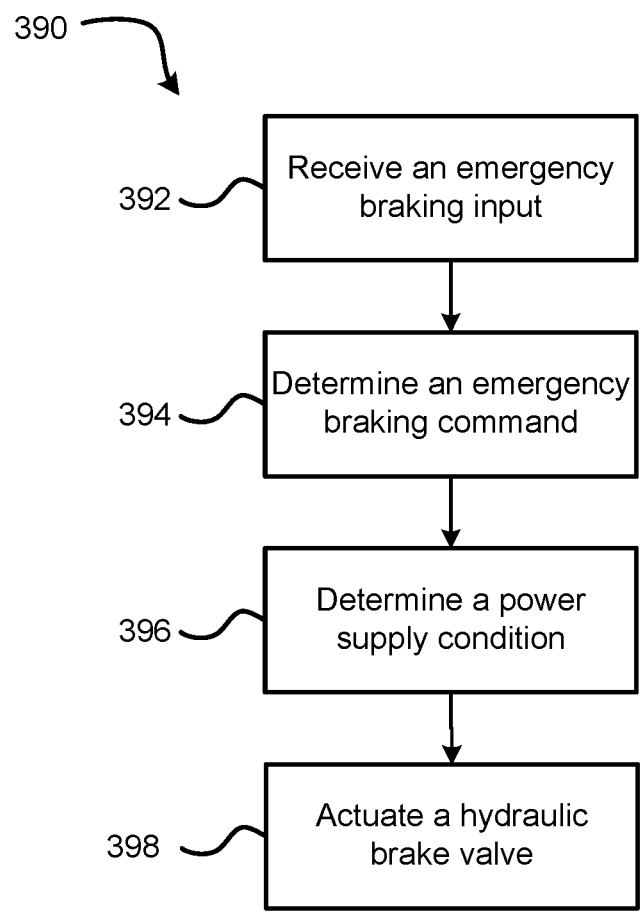
FIG. 3 is a schematic flow chart diagram of a method of controlling an emergency park brake system, in accordance with various embodiments.

In various embodiments, and with reference to FIG. 3, a method 390 of controlling an emergency park brake system is provided. The method 390 may include receiving an emergency braking input at step 392. For example, an emergency park brake controller may receive the emergency braking input via a displacement sensor coupled to a user input interface (e.g., a brake handle). The method 390 may further include determining an emergency braking command at step 394. In various embodiments, the emergency park brake controller generates the emergency braking command based on the emergency braking input. Still further, the method 390 may include determining, by the emergency park brake controller, a power supply condition at step 396. Determining the power supply condition (step 396) may be based on the emergency braking command determined at step 394. In various embodiments, the method 390 further includes actuating a hydraulic brake valve at step 398. Step 398 may be performed by the emergency park brake controller, via an electromechanical actuator, and based on the emergency braking command and the power supply condition determined in steps 394 and 396, respectively.

In various embodiments, actuating the hydraulic brake valve to apply a braking force (step 398) to wheels of the aircraft is performed in response to the power supply condition indicating a power connection. In various embodiments, step 398 includes transmitting, by the emergency park brake controller and via a first electrical communication pathway, the emergency braking command to the electromechanical actuator. Step 398 may also include transmitting, by the emergency park brake controller, based on the power supply condition, and via a second electrical communication pathway, electrical power from an electrical power interface to the electromechanical actuator.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure.

The scope of the disclosure is accordingly to be limited by nothing other than the appended claims, in which reference to an element in the singular is not intended to mean "one and only one" unless explicitly so stated, but rather "one or more." It is to be understood that unless specifically stated otherwise, references to "a," "an," and/or "the" may include one or more than one and that reference to an item in the singular may also include the item in the plural. All ranges and ratio limits disclosed herein may be combined.

Moreover, where a phrase similar to "at least one of A, B, and C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Also, any reference to attached, fixed, connected, coupled or the like may include permanent (e.g., integral), removable, temporary, partial, full, and/or any other possible attachment option. Different cross-hatching is used throughout the figures to denote different parts but not necessarily to denote the same or different materials.

The steps recited in any of the method or process descriptions may be executed in any order and are not necessarily limited to the order presented. Furthermore, any reference to singular includes plural embodiments, and any reference to more than one component or step may include a singular embodiment or step. Elements and steps in the figures are illustrated for simplicity and clarity and have not necessarily been rendered according to any particular sequence. For example, steps that may be performed concurrently or in different order are illustrated in the figures to help to improve understanding of embodiments of the present disclosure.

Any reference to attached, fixed, connected or the like may include permanent, removable, temporary, partial, full and/or any other possible attachment option. Additionally, any reference to without contact (or similar phrases) may also include reduced contact or minimal contact. Surface shading lines may be used throughout the figures to denote different parts or areas but not necessarily to denote the same or different materials. In some cases, reference coordinates may be specific to each figure.

Systems, methods and apparatus are provided herein. In the detailed description herein, references to "one embodiment", "an embodiment", "various embodiments", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element is intended to invoke 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. An emergency park brake system of an aircraft, the emergency park brake system comprising:
   an electrical power interface configured to receive electrical power from a power source;
   an electromechanical actuator coupled to the electrical power interface via a selective electrical connection;
   a hydraulic brake valve, wherein the electromechanical actuator is mechanically coupled to and configured to selectively actuate the hydraulic brake valve; and
   a plurality of discrete hardware controllers interconnected via a first electrical communication pathway and a second electrical communication pathway, wherein the plurality of discrete hardware controllers have instructions stored thereon that cause the emergency park brake system to perform operations comprising:
   receiving an emergency braking input;
   determining a power connection command based on the emergency braking input;
   determining an emergency braking command based on the emergency braking input;
   transmitting, via the first electrical communication pathway, the power connection command to the electrical power interface;
   transmitting, via the second electrical communication pathway, the emergency braking command to the electromechanical actuator;
   determining a power supply condition, based on the power connection command; and
   transmitting, based on the power supply condition and via the selective electrical connection, electrical power from the electrical power interface to the electromechanical actuator.

2. The emergency park brake system of claim 1, further comprising a user input interface, wherein the emergency braking input is a displacement of the user input interface.

3. The emergency park brake system of claim 2, further comprising a displacement sensor coupled to the user input interface, wherein the displacement sensor is configured to detect the displacement of the user input interface and generate the emergency braking command based on the displacement of the user input interface.

4. The emergency park brake system of claim 3, wherein whether the electromechanical actuator is in power receiving communication with the electrical power interface is based on the emergency braking command.

5. The emergency park brake system of claim 4, further comprising an excitation monitor coupled to the displacement sensor and configured to detect a validity of an excitation level of the displacement sensor.

6. The emergency park brake system of claim 5, wherein whether the electromechanical actuator is in power receiving communication with the electrical power interface is based on the emergency braking command and the validity of the excitation level of the displacement sensor.

7. The emergency park brake system of claim 5, wherein the power supply condition is based on the validity of the excitation level of the displacement sensor.

8. The emergency park brake system of claim 3, wherein determining the emergency braking command comprises comparing the displacement of the user input interface with a threshold displacement.

9. The emergency park brake system of claim 8, wherein the power supply condition indicates a power disconnection in response to the displacement of the user input interface being less than the threshold displacement.

10. The emergency park brake system of claim 8, wherein the power supply condition indicates a power connection in response to the displacement of the user input interface being greater than the threshold displacement.

11. A method of controlling an emergency park brake system of an aircraft, the method comprising:
    receiving, by an emergency park brake controller, an emergency braking input;
    determining, by a first electrical communication pathway of the emergency park brake controller, a power connection command based on the emergency braking input;
    determining, by a second electrical communication pathway of the emergency park brake controller, an emergency braking command based on the emergency braking input; and
    actuating, by the emergency park brake controller, via an electromechanical actuator, and based on the power connection command and the emergency braking command, a hydraulic brake valve.

12. The method of claim 11, wherein actuating the hydraulic brake valve to apply a braking force to wheels of the aircraft is performed in response to the power connection command comprising a power supply condition that indicates a power connection.

13. The method of claim 11, wherein actuating the hydraulic brake valve comprises:
    transmitting, by the emergency park brake controller, based on the power connection command, and via the first electrical communication pathway, electrical power from an electrical power interface to the electromechanical actuator; and
    transmitting, by the emergency park brake controller and via the second electrical communication pathway, the emergency braking command to the electromechanical actuator.

* * * * *